United States Patent Office 2,945,874
Patented July 19, 1960

2,945,874

ALKYLATION OF CHLORINATED SILANES

Herbert Jenkner, Hannover-Wulfel, Germany, assignor to Kali-Chemie Aktiengesellschaft, Hannover, Germany No Drawing. Filed Aug. 20, 1957, Ser. No. 679,154

Claims priority, application Germany Aug. 28, 1956

5 Claims. (Cl. 260—448.2)

The invention relates to the alkylation of silicon tetrachloride and alkyl or aryl chlorosilanes.

It has been proposed to replace one or more of the chlorine atoms in silicon tetrachloride and alkyl or aryl chlorosilanes by reacting said compounds at elevated temperatures and pressures with alkyl or aryl aluminum halides. The reaction proceeds, for instance, according to the equation $$2(CH_3)_2SiCl_2 + (CH_3)_2AlCl \rightarrow 2(CH_3)_3SiCl + AlCl_3$$

with precipitation of solid aluminum chloride. The alkylated chlorosilane is obtained in rather low yields, of only about 65 percent, calculated on the starting silicon compound, and about 55 percent, calculated on the aluminum methyl chloride.

A very serious drawback of the method is the clogging of the apparatus by the formed aluminum chloride; this makes it almost impossible to use the method on a commercial scale.

I have found that this drawback is prevented and that the desired end products can be obtained in yields of about 95 percent, when the reaction is carried out in the presence of inorganic chlorides which form complex or addition compounds with aluminum chloride. Such inorganic chlorides are suitable which form with $AlCl_3$, for instance, the complex ion $[AlCl_4]^-$.

Said compounds are much less volatile than the aluminum chloride itself; they do not clog the apparatus, are readily removed and do not enter into any side reactions with the reactants. Therefore, they allow of obtaining the alkylated silanes in high yields with substantially complete conversion of the organo-aluminum compounds used. The obtained aluminum chloride complex compounds are obtained in high purity and are excellent catalysts in chlorosilane conversion reactions.

Particularly suitable inorganic chlorides are the alkali metal chlorides such as sodium and potassium chloride.

Suitable organo-aluminum compounds are aluminum alkyls and alkyl aluminum halides, particularly trimethyl and triethyl aluminum, and their partially chlorinated substitution products. The corresponding higher alkyl compounds, such as propyl and butyl, and also aryl compounds, may be used too but I prefer the methyl and ethyl compounds.

By varying the ratio of organo-aluminum compound and silicon halide, for instance silicon tetrachloride, the alkylation degree of the silicon compound can be adjusted; an excess of organo-aluminum compound will produce a higher proportion of high alkylated silanes, whereas an excess of silicon tetrachloride will produce a higher yield of low alkylated silanes.

The reaction may be carried out at atmospheric or elevated pressure, for instance pressures of about 10 to 100 atm., and solvents, diluents or suspensions may be used. The reaction temperature will depend on the reactants and pressures used and will be in the range of 150 to 500° C. At higher temperatures within said range and at extended reaction times, relatively larger yields of dialkylchlorosilane are obtained.

The following examples are given to illustrate the invention. All parts are given by weight, unless indicated otherwise.

*Example 1*

57 parts of triethyl aluminum were heated in an autoclave at 300° C. for 1 hour with 127.5 parts of $SiCl_4$ and 30 parts of NaCl. 85 parts of a mixture of silanes was obtained, consisting of about

| | |
|---|---|
| 12% | $RSiCl_3$. |
| 20% | $R_2SiCl_2$ R=ethyl.  |
| 63% | $R_3SiCl$. |
| Balance | $SiR_4$. |

In addition, 102 parts of almost colorless $NaAlCl_4$ were obtained as by-product, which remained as solid residue in the autoclave after release of the pressure and cooling to room temperature. On hydrolysis, said residue did not develop ethane; this shows that the conversion of the triethyl aluminum was quantitative.

*Example 2*

57 parts of triethyl aluminum were reacted with 85 parts of $SiCl_4$ and 30 parts of NaCl at 250–290° C. in the same apparatus as used in Example 1. The reaction time was 1.5 hours.

There was obtained a mixture of silanes containing about 31 percent of $R_3SiCl$ and 61 percent of $SiR_4$. In addition, 4 percent of a mixture consisting of $R_2SiCl_2$ and $RSiCl_3$ were obtained. The balance consisted of silicon compounds, which contained, in addition to Si—O—, also Si—C—Si linkages. The conversion calculated on the triethyl aluminum was quantitative.

*Example 3*

The reaction was carried out as described in Example 1 but $SiCl_4$ was replaced by diethyldichlorosilane. Also in this reaction, the conversion, calculated on $Al(C_2H_5)_3$, was quantitative; $NaAlCl_4$ obtained as residue did not develop any ethane on hydrolysis.

The reaction proceeds with substantially the same yields if diethyl aluminum chloride is used instead of triethyl aluminum.

*Example 4*

A mixture of 57 parts of triethyl aluminum and 127 parts of $SiCl_4$ was added dropwise to a suspension of 30 parts of sodium chloride in 175 parts of a mineral oil ($b_1$=190–210° C.), which had been heated under stirring to 220–230° C. There were obtained 113 parts of ethyl chlorosilanes containing 58.8 percent of Cl ($SiCl_4$ =83.5% Cl). The reaction residue consisted of a solid precipitate (which was liquid during the reaction), from which the supernatant oil diluent could be separated by simple decantation.

*Example 5*

209 parts of phenyl trichlorosilane and 100 parts of the mineral oil used in Example 4 were mixed. Subsequently, 20 parts of sodium chloride were added to said mixture, and 37.6 parts of triethyl aluminum were dropped in within .5 hour at 210° C. with stirring. 168 parts of a mixture of phenylethylchlorosilanes were obtained; the Cl content was 34.6 percent, compared with 50.4 percent of the phenyltrichlorosilane used as starting material.

If it is desired to prepare methyl silanes, the triethyl aluminum and diethyl aluminum chloride has to be replaced in the above examples by trimethyl aluminum and dimethyl aluminum chloride, respectively, in the corresponding mol ratio.

I claim:
1. A process for the alkylation of a silicon compound of the formula

$$R_aSiCl_{4-a}$$

wherein R is alkyl, and $a$ is an integer from 0 to 3, said process comprising reacting said compound with an organoaluminum compound of the formula $$R_b^1AlCl_{3-b}$$

wherein $R^1$ is alkyl and $b$ is an integer from 1 to 3, at a temperature of about 150 to 500° C. in the presence of an alkali metal chloride in an amount substantially sufficient to convert the aluminum chloride formed during the reaction to MeAlCl$_4$, Me being alkali metal, cooling so as to precipitate said MeAlCl$_4$, and separating the obtained alkylated silanes from said precipitated MeAlCl$_4$.

2. The process as defined in claim 1 wherein the reaction is carried out in an inert organic diluent.

3. The process as defined in claim 1 wherein the reaction is carried out in a high boiling mineral oil as diluent.

4. The process as defined in claim 1 wherein the reaction is carried at a temperature of about 150 to 500° C. and a pressure of about 10 to 100 atm.

5. The process which consists in reacting silicon tetrachloride with an organoaluminum compound of the formula $$R_b^1AlCl_{3-b}$$

wherein $R^1$ is a member of the group consisting of methyl and ethyl and $b$ is an integer from 1 to 3, at a temperature of about 150 to 500° C. in the presence of sodium chloride in an amount sufficient to convert aluminum chloride formed during the reaction to NaAlCl$_4$, cooling the reaction mixture so as to precipitate said NaAlCl$_4$, and separating the obtained alkylated silanes from said precipitated NaAlCl$_4$.

References Cited in the file of this patent

UNITED STATES PATENTS

| | | |
|---|---|---|
| 2,579,341 | Schwenker | Dec. 18, 1951 |
| 2,647,136 | Sauer | July 28, 1953 |
| 2,717,257 | Bluestein | Sept. 6, 1955 |
| 2,739,165 | Plueddemann | Mar. 20, 1956 |

FOREIGN PATENTS

| | | |
|---|---|---|
| 888,852 | Germany | Sept. 7, 1953 |
| 908,019 | Germany | Apr. 1, 1954 |